Aug. 1, 1967  H. B. BISHOP  3,333,638
LIQUID DISPOSAL
Filed April 26, 1965

INVENTOR
H. B. BISHOP
BY *Young & Quigg*
ATTORNEYS

United States Patent Office 3,333,638
Patented Aug. 1, 1967

3,333,638
LIQUID DISPOSAL
Harold B. Bishop, Borger, Tex., assignor to Phillips
Petroleum Company, a corporation of Delaware
Filed Apr. 26, 1965, Ser. No. 450,592
3 Claims. (Cl. 166—42)

ABSTRACT OF THE DISCLOSURE

Surface liquid disposed of in a well that contains a producing zone by pumping the surface liquid through a restriction which causes drawing of liquid from the producing zone and into an adjacent liquid-absorbing zone while allowing desirable material drawn from the producing zone to rise to the surface.

---

This invention relates to a method and apparatus for the disposal of at least one liquid in a well. In one aspect this invention relates to a method and apparatus whereby at least two liquids are disposed of simultaneously by utilizing no more energy than that supplied by a standing column of one of said liquids disposed of.

Although this invention applies broadly to wells which produce a gas and/or a liquid which is desired to be recovered, as well as undesirable liquid such as water; and, although any liquid can be employed to dispose of the undesired liquid produced in the well, for the sake of clarity this invention will be described relative to wells wherein only gas is produced and the only undesired liquid produced is water. Also, the description will be limited to only one liquid, i.e. water, employed to dispose of the undesired water produced in the well.

In the production of natural gas from subsurface formations, it frequently occurs that some water is produced into the well bore along with the natural gas. When this occurs, the water must be removed from the well bore if continued gas production is to be possible. In many instances the water produced will accumulate in the well bore and will ultimately build up to a height such that the hydrostatic pressure within the well bore is sufficient to overcome the pressure of the gas in the formation thereby terminating gas production of the well.

Heretofore water has been removed from a well bore by pumping the water to the surface and disposing of it from that point. For example, surface liquids are sometimes pumped down into the well bore with sufficient pressure to force both the surface liquid and the water in the well bore back to the surface. Generally, these procedures are expensive in that the wells are usually deep and therefore the pressure required to force both the surface liquid and the water in the well bore to the surface is great. Furthermore, such procedures tend to create additional problems because water produced from formations within the earth usually contains large amounts of natural salts and the salt water removed from the well bore must be carefully disposed of on the surface so as not to contaminate nonsaline surface streams or other bodies of surface water.

Generally, it is most desirable to dispose of salt water in subsurface formations since many subsurface formations are both porous and permeable to liquids and can be filled with salt water without confronting problems inherent in surface disposal of salt water. Also, it is quite common for a porous or permeable formation to lie closely adjacent to a producing gas and the like formation.

It has now been found that water produced by a gas-producing formation can be readily disposed of without removing the water from the well bore and with the expenditure of no more energy than is present in the form of potential energy of a column of surface water in the tubing of the well, which column extends from the gas-producing formation at least part way up toward the surface of the well. By this invention a liquid such as water is employed to at least partially fill the tubing of the well above a gas-producing formation and the pressure head of this column of water is employed to force that water through a restricted zone or venturi. The venturi is in communication with the gas-producing formation and as the water in the tubing is forced through the venturi by its own pressure head it pulls water from the gas-producing formation. The water from the tubing and the water from the gas-producing formation are both then passed into an adjacent zone or formation which is capable of absorbing a liquid.

One outstanding advantage of this invention is that salt water from other wells which must otherwise be disposed of on the surface can be employed as the pressuring water in the tubing thereby simultaneously disposing of both surface salt water from other wells and subsurface salt water from the gas-producing formation. Thus, this invention efficiently, economically, and simply disposes of two separate liquids from two separate sources. The water forced into underlying, porous and permeable zones is efficiently disposed of without erecting a pressure on the productive formations or horizons of the well in which it is disposed.

The apparatus of this invention for sucking water from a productive formation and injecting same into a disposal zone includes means for forming a pressure head of water or other liquids in the tubing above the productive formation and for passing the liquids through a restriction means which is openly connected with the producing formation so that the passage of the water through the restriction will tend to create a vacuum which in turn will pull water from the productive formation. The apparatus also includes means for passing the combined water from the tubing and formation into an adjacent zone capable of absorbing a liquid.

Accordingly, it is an object of this invention to provide a new and improved method and apparatus for disposing of a liquid. It is another object of this invention to provide a new and improved method and apparatus for disposing of two liquids in a well with minimum expenditure of energy.

Other aspects, objects and the several advantages of the invention will be readily apparent to those skilled in the art from the description, the claims and the drawing.

Figure 1:
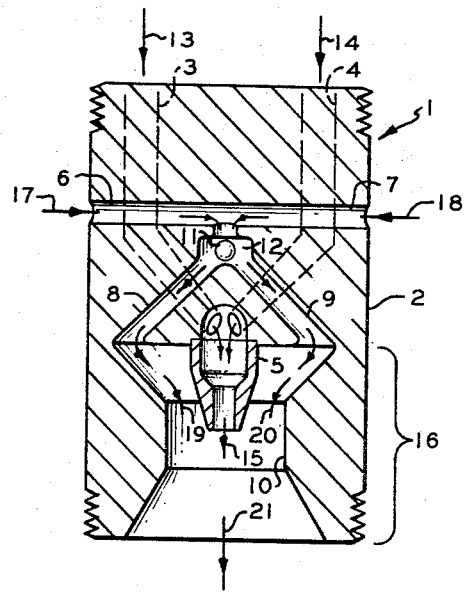
FIGURE 1 is a cross section of an injector tool embodying this invention.

In FIGURE 1 there is shown an injector by-pass tool 1 having a body 2 which is threaded at either end so that it can be inserted between sections of well tubing. Conduits 3 and 4 are in open communication between the top of body 2 and therefore the interior of the upper part of the tubing to which body 2 is attached and nozzle means 5. Conduits 6 and 7 are in open communication with the sides of body 2, and therefore the well bore in which the tubing is inserted, and conduits 8 and 9. Conduits 8 and 9 are in turn in open communication with conduit 10 in the bottom of body 2 and the outlet end of nozzle 5. A float ball means 11 is reciprocably carried in opening 12 formed at the juncture of conduits 6, 7, 8, and 9 so as to allow a liquid to pass from 6 and 7 into 8 and 9 but not from 8 and 9 into 6 and 7.

In operation, surface water from the upper portion of tubing passes into body 2 in the direction of arrows 13 and 14 and out of nozzle 5 in the direction of arrow 15. Since the water in the upper tubing is under a substantial hydrostatic or pressure head due to the upper tubing being at least partially full of that water, the water stream leaves nozzle 5 and passes into the venturi section 16 of body 2 at a high velocity and tends to form a vacuum in conduits 6, 7, 8 and 9. This vacuum pulls or otherwise removes water from the well bore or gas-productive formation or both and passes it in the direction of arrows 17 and 18 through conduits 6 to 9 and into the venturi section 16 in the direction of arrows 19 and 20. The combined water streams then pass in the direction of arrow 21 out of the bottom of body 2 into the lower tubing.

Figure 2:
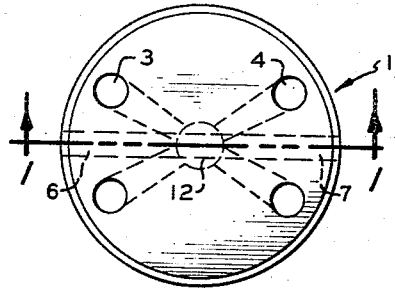
FIGURE 2 is a top view of the tool of FIGURE 1.

FIGURE 2 shows conduits 3 and 4 in their relationship to conduits 6 and 7 and opening 12. Although four conduits are shown to communicate with the top of tool 1, less than or more than four can be used.

Figure 3:
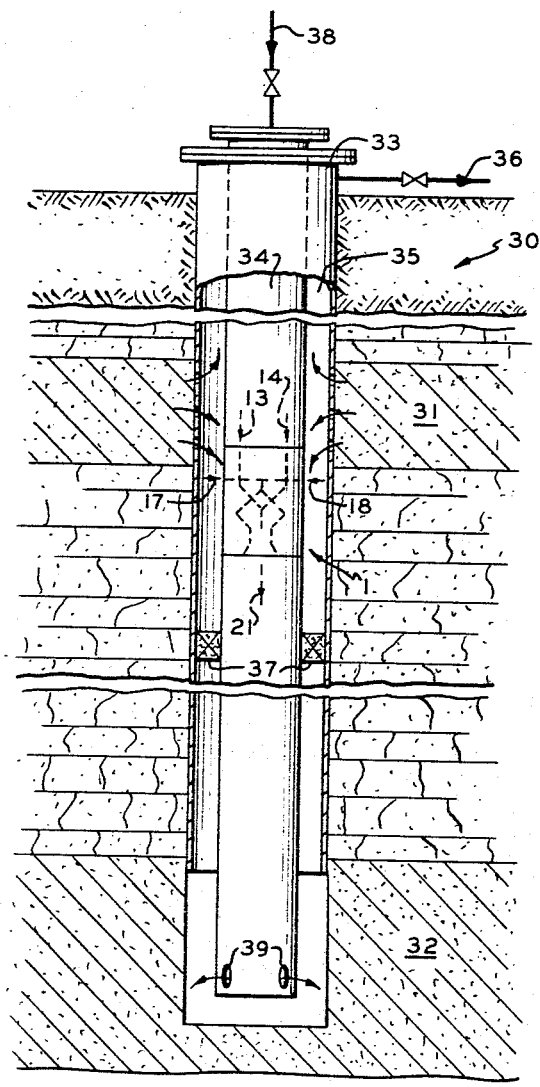
FIGURE 3 is a cross section of a well in the tubing of which is employed the tool of FIGURE 1.

FIGURE 3 shows a well 30 penetrating the earth to a gas-producing formation 31 and a porous or otherwise permeable zone 32. The well bore is equipped with a conventional casing 33 which, according to customary practice, is cemented to the well bore to prevent migration of fluids from one zone to another. Gas- and water-producing formation 31 communicates with the well bore as does zone 32 by means of openings or perforations in casing 33. Installed inside the casing is a string of tubing 34 which defines an annular space 35 with respect to casing 33. In operation, gas produced from formation 31 rises through 35 and is drawn off by means of valved production pipe 36 for further use. Tubing 34 is provided with a packer or other mechanical seal 37 to seal off the annular space between the gas- and water-producing formation and the porous zone. Installed in tubing 34 is the injector by-pass tool of FIGURE 1 as shown by reference numeral 1.

In operation, surface water is admitted to the upper portion of tubing 34 through valved line 38 and flow of the water is controlled to maintain the hydrostatic head into conduits 3 and 4 of tool 1 by conventional mechanical means not shown but which will be obvious to those skilled in the art. The upper portion of tubing 34 is filled with water to a height necessary to create the pressure required for forcing the surface water through nozzle 5 at a velocity and under a pressure sufficient to pull water from formation 31 into conduits 6 and 7 and inject both the surface water and the water from formation 31 into zone 32. The amount of water poured into the upper tubing will vary widely depending on the pressure required to force water into zone 32 and the specific gravity of the surface water. For example, if the pressure required for injecting water into zone 32 is 300 pounds per square inch, and if the surface water has a specific gravity such that it will exert a pressure of about 0.40 pound per square inch per foot of height, an amount of water sufficient to form a column of water in the tubing 34 above tool 1 should be at least 750 feet above zone 32.

The combined water streams 13, 14, 17, and 18 represented by 21 pass into the lower portion of tubing 34 and out perforations 39 in the bottom of that tubing into zone 32.

It should be noted that this invention is also applicable where the fluids produced from the producing formation include water and oil or water, oil and gas.

Reasonable variations and modifications are possible within the scope of this disclosure without departing from the spirit and scope of the invention.

I claim:
1. A method for disposing of a first subsurface liquid associated with a gas producing formation and a second surface liquid, said first liquid being produced in a gas well having a tubing string comprising sealing off a gas portion between the first liquid- and gas-producing formation and a lower adjacent zone capable of absorbing said liquids, forming a pressure head of said second liquid in the tubing above said first liquid-producing formation, passing said second liquid solely by force of gravity through a venturi which is in open communication with said first liquid-producing formation thereby creating a vacuum for removing said first liquid from said formation and said gas, allowing said gas to rise to the surface, and passing said first and second liquids into said adjacent zone.

2. A method for disposing of at least a first liquid produced with a gas product in gas well bore having a tubing string therein comprising sealing off a portion of the annulus defined by the tubing string and the gas well bore between the first liquid- and gas-producing formation and a lower zone capable of absorbing liquids, forming a pressure head of a second liquid in the tubing above said first liquid- and gas-producing formation by filling said tubing with said second liquid to a height sufficient to create a potential pressure of said second liquid which is sufficient to force liquids into said adjacent zone, passing said second liquid through a venturi zone which is in open communication with said first liquid- and gas-producing formation thereby forming at least a partial vacuum which in turn pulls said first liquid from said formation, allowing the gas associated with said first liquid to rise to the surface, and passing said first and second liquids out of said tubing below said gas-producing formation and injecting same into said lower zone for disposal thereof.

3. The method according to claim 2 wherein both of said liquids are comprised of water.

References Cited
UNITED STATES PATENTS

| | | | |
|---|---|---|---|
| 2,194,616 | 3/1940 | Schoeneck | 166—6 X |
| 2,858,890 | 11/1958 | McMahon | 166—42 X |

CHARLES E. O'CONNELL, *Primary Examiner.*

JACOB L. NACKENOFF, *Examiner.*

N. C. BYERS, *Assistant Examiner.*